United States Patent
Chen et al.

(10) Patent No.: US 6,844,701 B2
(45) Date of Patent: Jan. 18, 2005

(54) OVERMODULATION SYSTEMS AND METHODS FOR INDUCTION MOTOR CONTROL

(75) Inventors: Li Chen, Livonia, MI (US); Richard J. Hampo, Plymouth, MI (US); Venkatapathi R. Nallapa, West Bloomfield, MI (US)

(73) Assignee: Ballard Power Systems Corporation, Dearborn, MI (US)

( * ) Notice: Subject to any disclaimer, the term of this patent is extended or adjusted under 35 U.S.C. 154(b) by 0 days.

(21) Appl. No.: 10/345,872

(22) Filed: Jan. 15, 2003

(65) Prior Publication Data

US 2003/0164028 A1 Sep. 4, 2003

Related U.S. Application Data

(60) Provisional application No. 60/319,075, filed on Jan. 16, 2002.

(51) Int. Cl.[7] .............................. H02P 7/36; H02P 5/28; H02P 3/18; H02P 7/00
(52) U.S. Cl. ....................... 318/825; 318/822; 318/806; 318/432
(58) Field of Search ............................... 318/825, 822, 318/798, 801, 802, 806, 811, 492, 826, 533, 432, 689; 307/131

(56) References Cited

U.S. PATENT DOCUMENTS

| | | | | | |
|---|---|---|---|---|---|
| 5,479,081 | A | * | 12/1995 | Seibel et al. ................ | 318/805 |
| 5,818,192 | A | * | 10/1998 | Nozari ....................... | 318/609 |
| 6,184,648 | B1 | * | 2/2001 | Kato et al. .................. | 318/811 |
| 6,327,524 | B1 | * | 12/2001 | Chen .......................... | 318/826 |
| 6,407,531 | B1 | * | 6/2002 | Walters et al. .............. | 318/805 |
| 6,630,809 | B2 | * | 10/2003 | Chen et al. ................. | 318/804 |
| 6,696,811 | B2 | * | 2/2004 | Reutlinger .................. | 318/606 |
| 6,707,270 | B2 | * | 3/2004 | Chen et al. ................. | 318/798 |
| 2004/0036434 | A1 | * | 2/2004 | Chen et al. ................. | 318/432 |

* cited by examiner

*Primary Examiner*—David Martin
*Assistant Examiner*—Edgardo San Martin
(74) *Attorney, Agent, or Firm*—Seed IP Law Group PLLC

(57) ABSTRACT

Systems and methods for controlling an induction motor including detecting a field weakening operation state of the motor, wherein the field weakening operation state is detected when a flux current, $I_d$, in the motor is reduced to a predetermined fraction of its normal, non-voltage limited value. The systems and methods also including an overmodulation operation state of the motor before said field weakening operation state is detected and enabling the overmodulation operation state of the motor after said field weakening operation state is detected.

15 Claims, 2 Drawing Sheets

US 6,844,701 B2

OVERMODULATION SYSTEMS AND METHODS FOR INDUCTION MOTOR CONTROL

BACKGROUND OF INVENTION

1. Field of the Invention

The present invention relates generally to systems and methods for directing and controlling the operation of an induction motor.

2. Background of Invention

The "fuel" powering an induction motor, such as a field-oriented induction motor, is current. This current may be divided into two components, torque current and flux current. Torque current may be viewed as that component of the current which generates motive force, or torque. Flux current may be viewed as that component of the current which generates magnetic flux in the rotor of the motor. Shaft torque and rotor flux are related, with shaft torque proportional to the product of rotor flux and torque current. At high speeds, shaft torque may be calculated using back-EMF voltage.

Typically, in an induction motor, as the speed increases the back-EMF voltage increases as well. This reduces the voltage available to drive current into the motor, and thus limits the ability of the motor to produce torque. One well-known technique, field weakening, reduces the magnitude of the flux in the motor, thus reducing the back-EMF voltage and increasing the torque-producing capability of the motor.

Another well-known technique, overmodulation, involves the injection of harmonics into the fundamental current of the motor. These harmonics increase the overall size of the fundamental current. This allows for greater torque production than may be achieved with a pure sine wave drive, given a fixed DC bus voltage. One limitation of overmodulation, however, is that the fundamental current waveform becomes distorted and, as a consequence, nuisance trips of the overcurrent protection result.

SUMMARY OF INVENTION

Thus, what is needed are systems and methods which disable overmodulation operation until field weakening operation has taken effect. At this point, overmodulation may occur without tripping the overcurrent protection as the motor is past its "corner point" (the highest-speed point of maximum motor current).

Taught herein are systems and methods which improve the robustness of the overmodulation strategy for controlling an induction motor during high-speed operation. These systems and methods reduce the occurrence of nuisance overcurrent faults by delaying the onset of overmodulation until field weakening has taken effect.

In one embodiment, a method for controlling an induction motor includes detecting a field weakening operation state of the motor, wherein the field weakening operation state is detected when a flux current, $I_d$, in the motor is reduced to a predetermined fraction of its normal, non-voltage limited value. The method also includes disabling an overmodulation operation state of the motor before said field weakening operation state is detected and enabling the overmodulation operation state of the motor after said field weakening operation state is detected.

In another embodiment, a system for controlling an induction motor includes means for detecting a field weakening operation state of the motor, wherein the field weakening operation state is detected when a flux current, $I_d$, in the motor is reduced to a predetermined fraction of its normal, non-voltage limited value. The system also includes means for disabling an overmodulation operation state of the motor before said field weakening operation state is detected and means for enabling the overmodulation operation state of the motor after said field weakening operation state is detected.

DETAILED DESCRIPTION OF THE INVENTION

In the following description, certain specific details are set forth in order to provide a through understanding of various embodiments of the invention. However, one skilled in the art will understand that the invention may be practiced without these details. In other instances, well-known structures associated with electrical circuits and circuit elements have not been shown or described in detail to avoid unnecessarily obscuring descriptions of the embodiments of the invention.

Unless the context requires otherwise, throughout the specification and claims which follow, the word "comprise" and variations thereof, such as, "comprises" and "comprising" are to be construed in an open, inclusive sense, that is as "including, but not limited to."

During the high-speed operation of an induction motor, such as a field-oriented induction motor, as motor speed increases the back-EMF voltage increases as well. This reduces the voltage available to drive current into the motor, and thus limits the ability of the motor to produce torque. Field weakening reduces the magnitude of the flux in the motor, thus reducing the back-EMF voltage and increasing the torque-producing capability of the motor. As taught herein, field weakening occurs automatically when the applied motor terminal voltage reaches the maximum available voltage, i.e. the modulation index reaches 100%. As the speed increases further, the flux is reduced so that the torque-producing current may be increased.

As described above, overmodulation allows for the injection of harmonics into the fundamental current of the motor. These harmonics increase the overall size of the fundamental current. This allows for greater torque production than may be achieved with a pure sine wave drive, given a fixed DC bus voltage. One limitation of overmodulation, however, is that the fundamental current waveform becomes distorted and, as a consequence, nuisance trips of the overcurrent protection result. The overcurrent protection typically includes electronic hardware and is intended to prevent damage to the inverter components.

Figure 1:
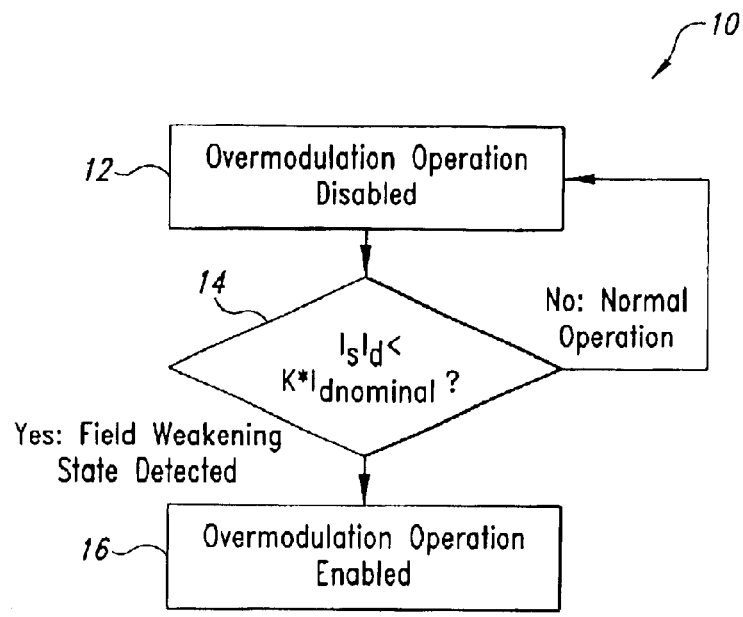
FIG. 1 is a flow chart of one embodiment of the overmodulation strategy of the present invention, linking the enabling of overmodulation operation of an induction motor to field weakening operation at high speeds.

Referring to FIG. 1, in one embodiment, the overmodulation strategy 10 of the present invention involves linking the enabling of overmodulation operation of the induction motor to field weakening operation at high speeds. Overmodulation operation is disabled 12 until a field weakening state is detected 14. In other words, the modulation index is allowed to rise past 100%. Specifically, overmodulation operation is disabled 12 until the flux current, $I_d$, is reduced to a predetermined fraction of its normal, non-voltage limited value ($I_sI_d<K*I_{dnominal}$, where $I_{dnominal}$ is the non-voltage limited value of flux current). This fraction, K, may be, for example, ½, ¼, ⅛, etc. At this point, overmodulation operation is enabled 16 and harmonics are injected into the fundamental current of the motor, increasing torque production of the motor.

Figure 2:
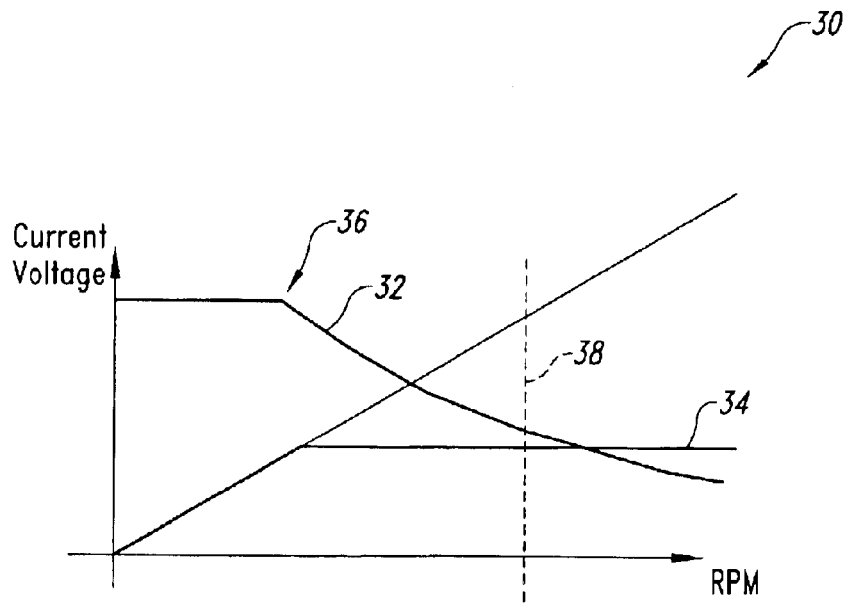
FIG. 2 is a graph of the relationship between current and voltage before and after field weakening has taken effect, highlighting a "corner point" where current and voltage are at their respective limits.

FIG. 2 is a graph 30 of the relationship between current 32 (i.e., phase current) and voltage 34 (i.e., back-EMF voltage) before and after field weakening has taken effect. The "corner point" 36, where current and voltage are at their respective limits, is the point at which nuisance trips of the overcurrent protection typically occur. Once field weakening operation has taken effect, current is no longer at its limit illustrated by broken line 38 and overmodulation operation is enabled without risk of tripping the overcurrent protection. The back-EMF voltage may be reduced by ½, ¼, ⅛, etc. once the phase current is below the maximum low-speed value.

Figure 3:
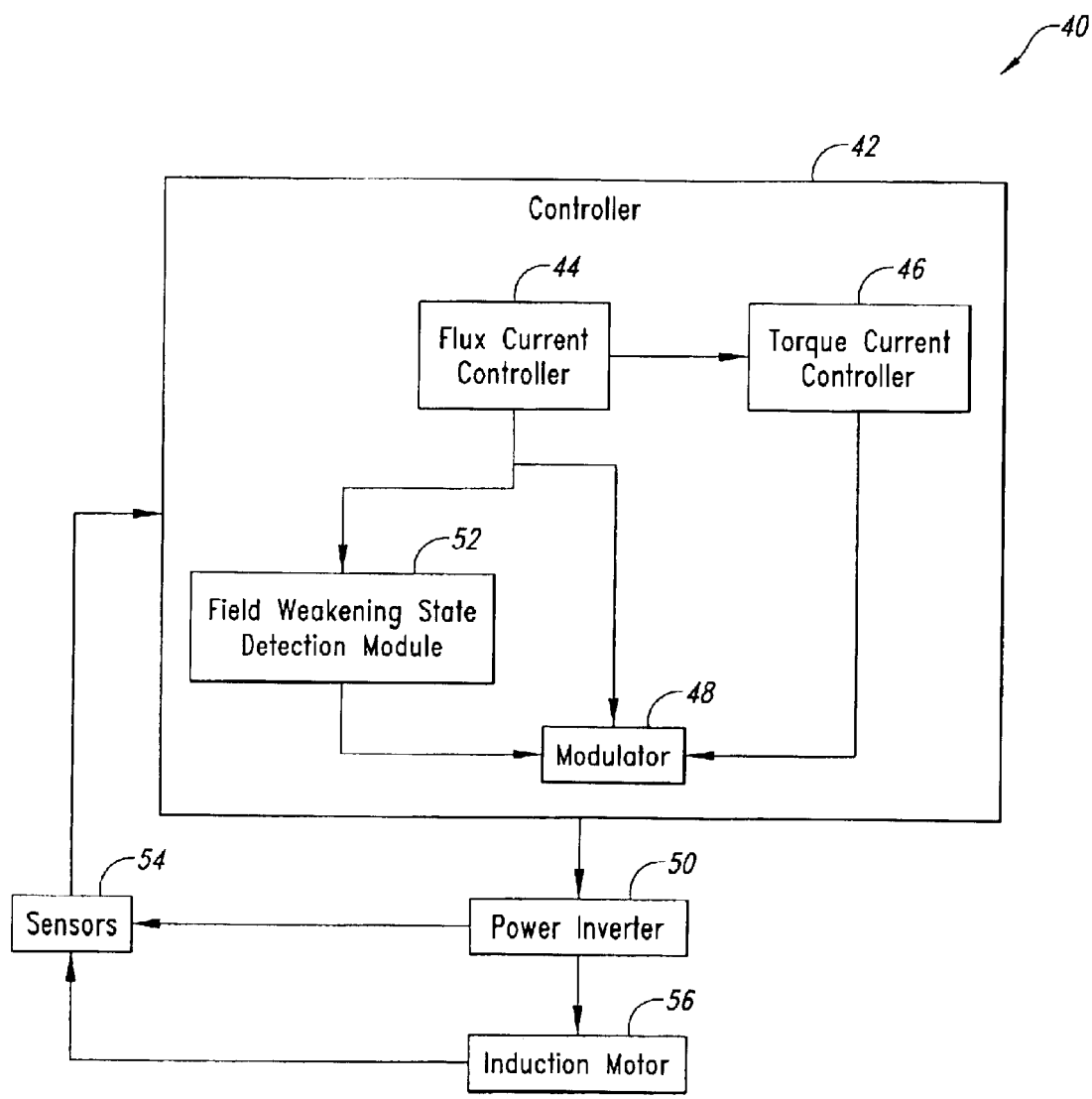
FIG. 3 is a functional block diagram of one embodiment of a system for carrying out the overmodulation strategy of the present invention.

Referring to FIG. 3, in one embodiment, a system 40 for carrying out the overmodulation strategy of the present invention includes a controller 42, which may be, for example, a computer or other device including a central processing unit (CPU) and a memory. A flux current controller 44 and a torque current controller 46 provide commands to a modulator 48, which provides driving signals to the power inverter 50. A field weakening state detection module 52 is disposed within the controller 42. The field weakening state detection module 52 operates according to an algorithm to utilize information provided by one or more sensors 54 in order to detect when a field weakening operation has taken effect in the motor 56. As described above, this is accomplished by detecting when the flux current, $I_d$, is reduced to a predetermined fraction of its normal, non-voltage limited value. At this point, the modulator 48 enables overmodulation operation of the motor 56 in accordance with an appropriate algorithm.

All of the above U.S. patents, U.S. patent application publications, U.S. patent applications, foreign patents, foreign patent applications and non-patent publications referred to in this specification and/or listed in the Application Data Sheet, including but not limited to U.S. Provisional Application No. 60/319,075, filed Jan. 16, 2002, and entitled "OVERMODULATION SYSTEMS AND METHODS FOR INDUCTION MOTOR CONTROL," are incorporated herein by reference, in their entirety.

What is claimed is:

1. A method for controlling an induction motor, the method comprising:
   detecting a field weakening operation state of the motor;
   disabling an overmodulation operation state of the motor before the field weakening operation state is detected; and
   enabling the overmodulation operation state of the motor after the field weakening operation state is detected.

2. The method of claim 1 wherein detecting a field weakening operation state of the motor comprises detecting when a flux current in the motor is reduced to a predetermined fraction of a normal, non-voltage limited flux current value.

3. The method of claim 1 wherein detecting a field weakening operation state of the motor comprises detecting when a flux current in the motor is reduced to ½ of a normal, non-voltage limited flux current value.

4. The method of claim 1 wherein detecting a field weakening operation state of the motor comprises detecting when a flux current in the motor is reduced to ¼ of a normal, non-voltage limited flux current value.

5. The method of claim 1 wherein detecting a field weakening operation state of the motor comprises detecting when a flux current in the motor is reduced to $1/n^2$ of a normal, non-voltage limited flux current value, wherein n is an integer.

6. The method of claim 1 wherein the motor is a field-oriented induction motor.

7. A system for controlling an induction motor, the system comprising:
   means for detecting a field weakening operation state of the motor;
   means for disabling an overmodulation operation state of the motor until the field weakening operation state is detected; and
   means for enabling the overmodulation operation state of the motor after the field weakening operation state is detected.

8. The system of claim 7 wherein the means for detecting a field weakening operation state of the motor comprises means for detecting when a flux current in the motor is reduced to a predetermined fraction of a normal, non-voltage limited flux current value.

9. The system of claim 7 wherein the means for detecting a field weakening operation state of the motor comprises means for detecting when a flux current in the motor is reduced to ½ of a normal, non-voltage limited flux current value.

10. The system of claim 7 wherein the means for detecting a field weakening operation state of the motor comprises means for detecting when a flux current in the motor is reduced to ¼ of a normal, non-voltage limited flux current value.

11. The system of claim 7 wherein the means for detecting a field weakening operation state of the motor comprises means for detecting when a flux current in the motor is reduced to $1/n^2$ of a normal, non-voltage limited flux current value, where n is an integer.

12. The system of claim 7 wherein the motor is a field-oriented induction motor.

13. A computer-readable medium storing instructions for causing a controller to control an induction motor, by:
   detecting a field weakening operation state of the motor, wherein the field weakening operation state is detected when a flux current, $I_d$, in the motor is reduced to a predetermined sub-multiple of its normal, non-voltage limited value;
   disabling an overmodulation operation state of the motor before the field weakening operation state is detected; and
   enabling the overmodulation operation state of the motor after the field weakening operation state is detected.

14. A system for controlling an induction motor, the system comprising:
   at least one sensor to detect at least one operating condition of the motor;
   a controller coupled to the at least one sensor to receive at least one signal corresponding to the at least one operating condition of the motor detected by the at least one sensor, and programmed to:
   detect a field weakening operation state of the motor, wherein the field weakening operation state is detected when a flux current, $I_d$, in the motor is reduced to a predetermined fraction of its normal, non-voltage limited value;

disable an overmodulation operation state of the motor before the field weakening operation state is detected; and enable the overmodulation operation state of the motor after the field weakening operation state is detected.

15. The system of claim 14, further comprising:

a memory coupled to the controller, the memory storing an algorithm for execution by the controller.

* * * * *

UNITED STATES PATENT AND TRADEMARK OFFICE
CERTIFICATE OF CORRECTION

PATENT NO. : 6,844,701 B2
DATED : January 18, 2005
INVENTOR(S) : Li Chen et al.

It is certified that error appears in the above-identified patent and that said Letters Patent is hereby corrected as shown below:

<u>Title page,</u>
Item [57], ABSTRACT,
Line 6, "including an" should read as -- including disabling an --.

Signed and Sealed this

Thirtieth Day of August, 2005

JON W. DUDAS
*Director of the United States Patent and Trademark Office*